(12) United States Patent
Mallaun et al.

(10) Patent No.: US 9,930,727 B2
(45) Date of Patent: Mar. 27, 2018

(54) HEATING CONDUCTOR ARRANGEMENT

(75) Inventors: Peter Mallaun, See (AT); Karl Raggl, Hoefen (AT)

(73) Assignee: Plansee SE, Reutte (AT)

( * ) Notice: Subject to any disclaimer, the term of this patent is extended or adjusted under 35 U.S.C. 154(b) by 693 days.

(21) Appl. No.: 13/876,392

(22) PCT Filed: Sep. 23, 2011

(86) PCT No.: PCT/AT2011/000392
§ 371 (c)(1),
(2), (4) Date: Mar. 27, 2013

(87) PCT Pub. No.: WO2012/040753
PCT Pub. Date: Apr. 5, 2012

(65) Prior Publication Data
US 2013/0202007 A1 Aug. 8, 2013

(30) Foreign Application Priority Data
Sep. 27, 2010 (AT) ..................... 601/2010

(51) Int. Cl.
| H05B 3/03 | (2006.01) |
| H05B 3/66 | (2006.01) |
| F27D 11/02 | (2006.01) |
| C03B 29/00 | (2006.01) |
| C03B 29/08 | (2006.01) |
| C03B 29/02 | (2006.01) |
| C03B 29/04 | (2006.01) |

(52) U.S. Cl.
CPC ............. *H05B 3/03* (2013.01); *C03B 29/025* (2013.01); *C03B 29/08* (2013.01); *F27D 11/02* (2013.01); *H05B 3/66* (2013.01); *C03B 29/02* (2013.01); *C03B 29/04* (2013.01)

(58) Field of Classification Search
CPC .... H05B 3/03; H05B 3/66; H05B 3/68; F27D 11/02; C03B 29/04; C03B 29/06; C03B 29/08; C03B 29/025
USPC ........ 373/117, 127, 128, 134; 219/402, 408, 219/410, 390, 552, 403, 406
See application file for complete search history.

(56) References Cited

U.S. PATENT DOCUMENTS 1,844,906 A * 2/1932 Shaw ...................... H05B 3/66
338/319
1,849,595 A * 3/1932 Shaw .................... F24C 15/104
219/541

(Continued)

FOREIGN PATENT DOCUMENTS

| DE | 213811 A1 | 2/1983 |
| EP | 1170979 A1 | 1/2002 |

(Continued)

*Primary Examiner* — David Angwin
*Assistant Examiner* — John J Norton
(74) *Attorney, Agent, or Firm* — Laurence A. Greenberg; Werner H. Stemer; Ralph E. Locher

(57) ABSTRACT

An electrical heating conductor arrangement for heating a furnace has one or more strip-shaped portions with a generally horizontal sheet-like extent. The strip-shaped portions are formed by individual bands which have along their width an arcuate curvature with respect to a horizontal plane. The individual bands are partially mounted by at least one bearing element pivotably in the longitudinal direction of the respective band.

13 Claims, 3 Drawing Sheets

(56) References Cited

U.S. PATENT DOCUMENTS

| | | | | |
|---|---|---|---|---|
| 1,873,053 | A | * | 8/1932 | Shaw ................... H05B 3/66 219/536 |
| 3,446,938 | A | * | 5/1969 | Morgan ............... F24H 9/1818 165/82 |
| 3,812,276 | A | | 5/1974 | Cyrway, Jr. et al. |
| 4,771,166 | A | * | 9/1988 | McGuire ................ H05B 3/66 219/532 |
| 4,860,306 | A | * | 8/1989 | Gibb ..................... H05B 3/66 373/112 |
| 5,887,119 | A | * | 3/1999 | Wesseltoft ........... F24D 13/022 219/526 |
| 2002/0005404 | A1 | | 1/2002 | Maeda et al. |
| 2004/0238526 | A1 | * | 12/2004 | Leycuras ................ H05B 3/64 219/548 |
| 2005/0069014 | A1 | * | 3/2005 | Uemori ................... H05B 3/66 373/109 |
| 2007/0108201 | A1 | * | 5/2007 | Vinegar .................... C10L 3/08 219/770 |
| 2008/0217323 | A1 | * | 9/2008 | Baek ................... H05B 3/0076 219/538 |
| 2008/0296282 | A1 | | 12/2008 | Kobayashi et al. |

FOREIGN PATENT DOCUMENTS

| | | | |
|---|---|---|---|
| GB | 995089 | A | 6/1965 |
| JP | 7296957 | A | 11/1995 |
| JP | 8264270 | A | 10/1996 |

* cited by examiner

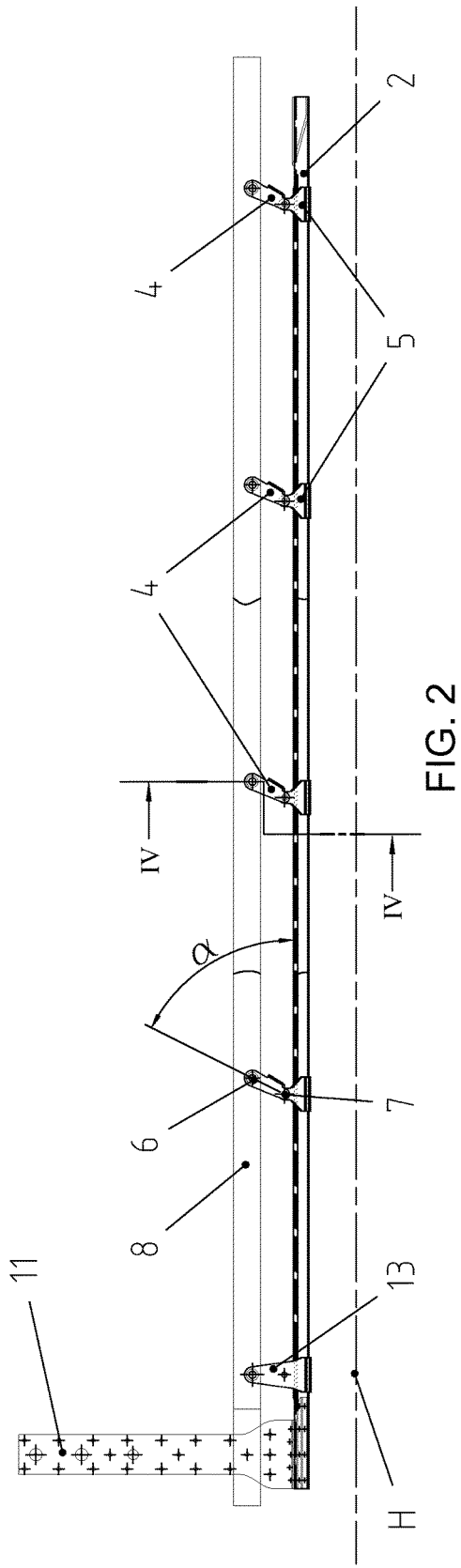
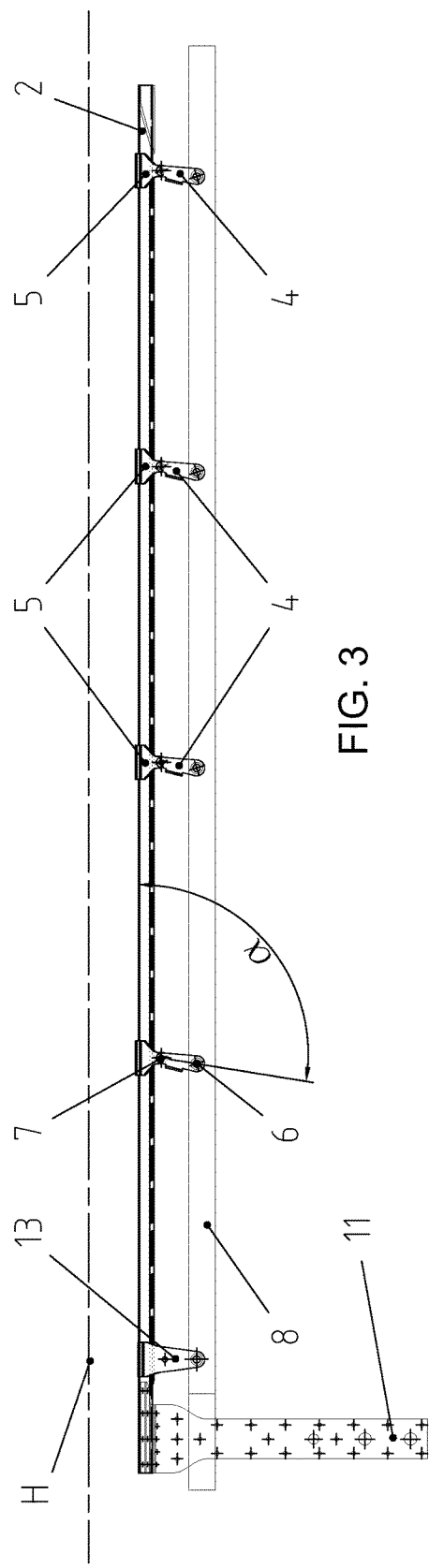

HEATING CONDUCTOR ARRANGEMENT

BACKGROUND OF THE INVENTION

Field of the Invention:

The invention relates to an electrical heating conductor arrangement for heating a furnace, the heating conductor having one or more strip-shaped portions with an essentially horizontal sheet-like extent, which are provided with an arcuate curvature with respect to a horizontal plane H.

EP 1 170 979 B1 describes a corresponding electrical heating conductor arrangement for a furnace for the heating of glass panes. In this arrangement, the heating conductor is produced in plate form, alternate slitting of the plate achieving a plurality of strip-shaped portions having an overall meandering run of the heating conductor. This meander is supported on both sides, over its entire extent, in corresponding recesses of stationary ceramic carrier devices and between these carrier devices has, with respect to a horizontal plane H, an arcuate run curved upwardly.

Materials mentioned for the heating conductor are Fe—Cr—Al alloys and Ni—Cr alloys, by means of which furnace temperatures of at most 1300° C. can be achieved.

In operation, during the heating of the heating conductor, its curvature increases due to the thermally induced expansion of the heating conductor material and due to its rigid clamping between the carrier devices. During cooling, the heating conductor contracts again and returns to its original curvature. This persistent alternating mechanical stress often results in the heating conductor material being overstressed, which may lead to fracture or premature failure of the heating conductor. Particularly when heating conductor materials, such as Mo or W, are used, these being employed to reach maximum furnace temperatures of the order of 1700° C. and above, a heating conductor arrangement of this type results in rapid failure of the heating conductor.

BRIEF SUMMARY OF THE INVENTION

The object of the present invention is, therefore, to provide a heating conductor arrangement, in which the heating conductor is exposed to as low mechanical stresses as possible as a result of the temperature differences between the operating state and state of rest, and in which, in particular, even heating conductor materials for maximum temperatures in the region of 1700° C. and above can be employed.

This is achieved, according to the invention, in that the strip-shaped portions are formed by individual bands, the bands having along their width the arcuate curvature with respect to the horizontal plane H, and in that the individual bands are partially mounted by means of at least one bearing element pivotably essentially in the longitudinal direction of the respective band.

The arcuate curvature of the heating conductor along its width achieves outstanding inherent stability which makes it possible to arrange the heating conductor so as to be self-supporting over long distances. The changes in length of the individual bands which are brought about by the change in temperature are compensated for by the movable bearing element, so that no appreciable stresses occur in the material. The disadvantages of the rigid clamping according to the prior art are thereby avoided. Owing to the arcuate curvature of the heating conductor along the width of the bands, the inherent stability of the heating conductor is maintained even at very high temperatures, so that the arrangement is also suitable for high-temperature heating conductors, such as heating conductors made from molybdenum or tungsten.

In an especially advantageous refinement of the invention, the bearing element has a holding portion which is adapted to the curvature of the band and which at least partially surrounds the latter.

What is achieved thereby is that the curvature of the band and therefore its inherent stability are maintained even when the heating conductor is heated.

In a further advantageous refinement of the invention, the pivotable bearing element has two axes of rotation and is connected pivotably to a carrier part via the first axis of rotation and is connected pivotably to the holding portion via the second axis of rotation.

Especially good movable mounting of the heating conductor, along with as good a support at the bearing points as possible, is thus achieved.

In an especially advantageous refinement of the invention, the pivotable bearing element is composed of two parallel legs which are spaced apart from one another and which are connected to one another at the axes of rotation at opposite ends of the legs by means of bearing bolts, and the bearing element is fastened to the carrier part pivotably and in an insulated manner via the first bearing bolt and is connected pivotably to the holding portion via the second bearing bolt.

This refinement achieves outstanding stability of the bearing elements and reliable fastening of the bearing elements to the carrier part.

It is especially advantageous if a plurality of individual bands are arranged parallel to one another and their ends are connected to one another alternately via connection pieces, so that the heating conductor arrangement is in the form of a meander.

A large-area heating conductor arrangement for heating a furnace over a large area is thus made possible in a simple way.

At the same time, it is especially advantageous if the current feeds to the heating conductor arrangement lie on the same side of the meander.

What is achieved by these designs is that the heating conductor is fixed rigidly on one side, to be precise at the current feed location, and, during heating, can expand, unobstructed, in the direction away from the current feeds, without excessive mechanical stresses occurring in the material.

In particular, it is also advantageous if the pivotable bearing elements are arranged in such a way that the respective connecting line of the axes of rotation has an angle of inclination a to the horizontal plane H, in such a way that, in the case of a suspended arrangement of the heating conductor, the second axis of rotation is oriented nearer to the nearest current feed than the first axis of rotation, and, in the case of a lying arrangement of the heating conductor, the second axis of rotation is oriented further away from the nearest current feed than the first axis of rotation.

By the pivotable bearing elements being arranged so as to be inclined in this way, the dead weight of the heating conductor material leads in the heating conductor to tensile stress which reduces or even completely prevents sagging of the heating conductor on account of the reduced strength caused by the action of temperature in the operating state.

It is also especially advantageous if a stationary bearing element for the respective band is arranged in the immediate vicinity of each current feed.

The rigid fixing of the heating conductor arrangement at the current feed location is thereby reinforced even further.

The inherent stability of the heating conductor in the longitudinal direction can also be increased in that the bands have two symmetrically arranged kinks along their curvature.

The heating conductor arrangement according to the invention is suitable especially advantageously for heating conductors for high-temperature furnaces with a heating conductor made from molybdenum or tungsten or alloys of these metals, although the arrangement is, of course, also advantageous for other heating conductor materials.

It is especially advantageous if the heating conductor and the bearing elements are composed of the same material. In this case, the change in form on account of the thermal loads is virtually identical, so that especially good dimensionally stable framing of the heating conductor by the bearing elements is achieved.

It is also advantageous if the current feeds to the heating conductor are designed to be laminated and merge with continuously decreasing material thickness into the heating conductor. This avoids an abrupt transition from the current feeds to the heating conductor, which often gives rise to the risk of a breaking point during thermal load.

The invention is explained in more detail below by means of drawings in which:

BRIEF DESCRIPTION OF THE SEVERAL VIEWS OF THE DRAWING

FIG. 2 shows the suspended heating conductor arrangement according to FIG. 1 on an enlarged scale in a side view FIG. 3 shows a comparable heating conductor arrangement to that according to FIG. 2 in a side view in a horizontal version

DESCRIPTION OF THE INVENTION

Figure 1:
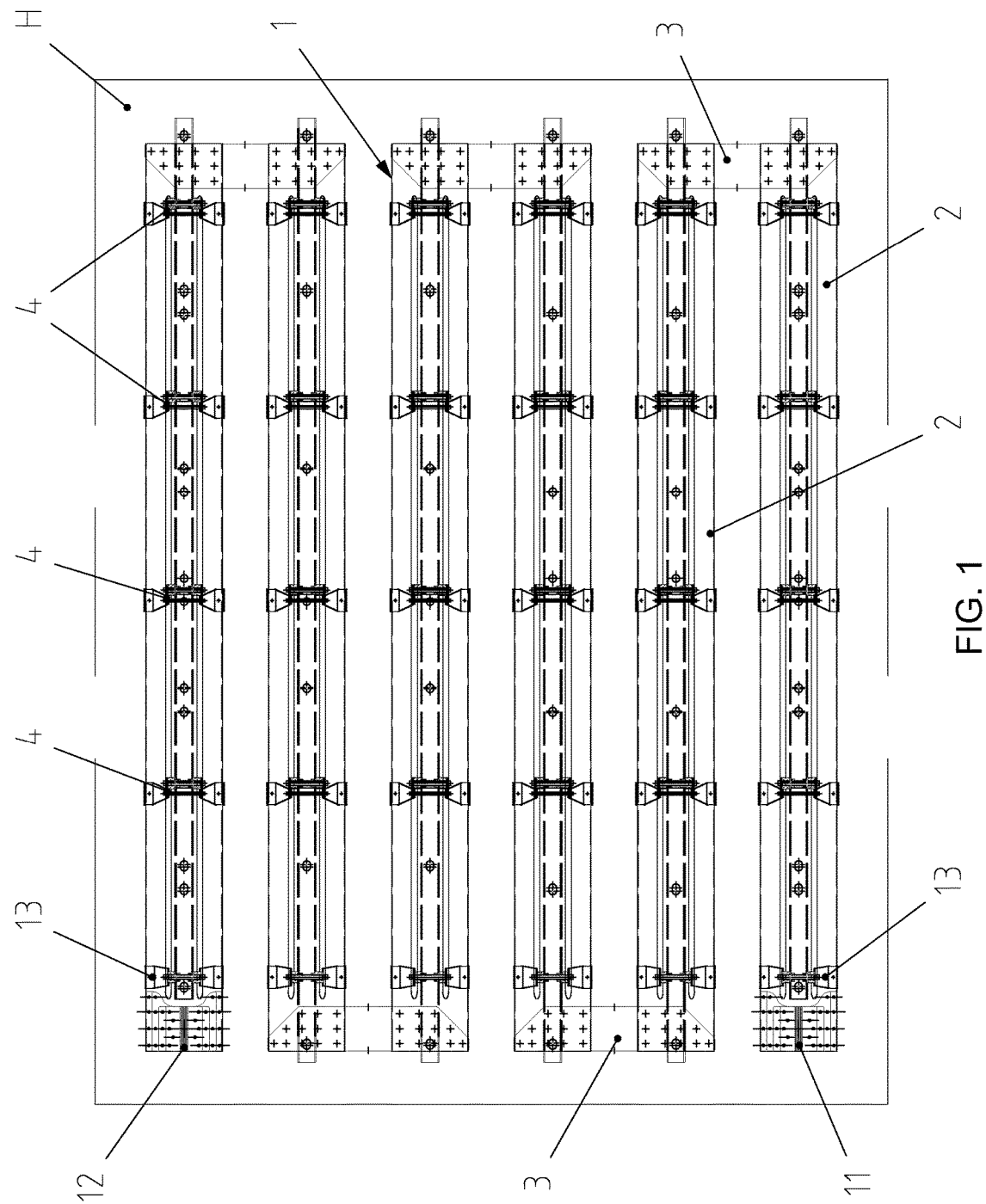
FIG. 1 shows the top view of a suspended heating conductor arrangement according to the invention

A heating conductor arrangement according to the invention for a suspended version provided on the ceiling of a furnace is illustrated in FIG. 1. The heating conductor -1- is constructed from 6 bands -2- which are arranged parallel to one another and which are connected to one another alternately at their ends by means of connection pieces -3-, this giving rise to a meandering heating conductor arrangement which extends essentially parallel to a horizontal plane H. The start and the end of the heating conductor -1- are connected to the current feeds -11- and -12-. The individual bands -2- are curved arcuately with respect to the horizontal plane H along their width. Each band -2- is mounted by means of a plurality of bearing elements -4- pivotably essentially in the longitudinal direction of the respective band.

Figure 4:
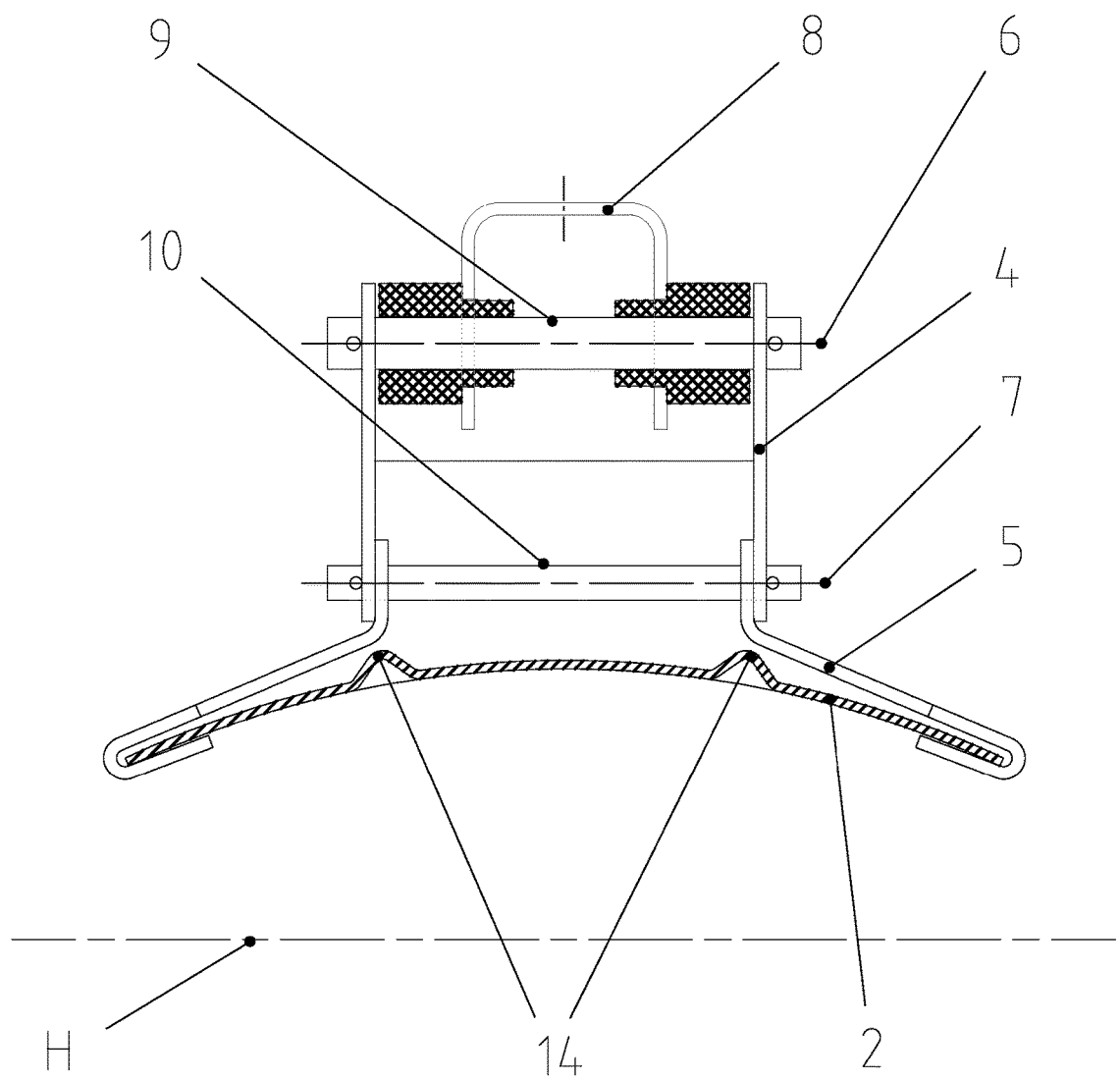
FIG. 4 shows a pivotable bearing element according to FIG. 1, partially in section, on an enlarged scale.

The bearing elements -13- arranged in the immediate vicinity of the current feeds -11- and -12- are stationary. The set-up of the bearing elements -4- may be gathered, in particular, from FIG. 4. Each pivotable bearing element -4- is composed of two parallel legs which are spaced apart from one another and which are connected to one another at the opposite ends via bearing bolts -9- and -10- having axes of rotation -6- and -7-. The bearing element -4- is connected pivotably to a carrier part -8- in an insulating manner via the first bearing bolt -9-. The bearing element -4- is connected pivotably to a holding portion -5- by means of the second bearing bolt -10-. This holding portion -5- serves for receiving the band -2-. Said holding portion is largely adapted to the curvature of the band -2- and surrounds the band -2- laterally. For reliable fixing, the band -2- is screwed or riveted to the holding portion -5-. In order to improve the inherent stability of the band -2- during heating even further, the band -2- is provided in the longitudinal direction with two symmetrically arranged kinks -14-.

The heating conductor arrangement according to FIG. 1 can be seen in a side view on an enlarged scale in FIG. 2.

The stationary bearing element -13- is provided directly next to the current feed -11- and is oriented perpendicularly to the horizontal plane H. By contrast, the pivotable bearing elements -4- lying next to it are arranged such that the connecting line of the axes of rotation -6- and -7- has an angle of inclination $\alpha$, deviating from 90°, to the horizontal plane H, specifically such that the second axis of rotation -7- is oriented nearer to the stationary bearing element -13- than the first axis of rotation -6-.

FIG. 3 illustrates the side view of a heating conductor arrangement in a lying version, such as is used in the floor region of a furnace. In this case, the pivotable bearing elements -4- are arranged exactly in reverse, specifically such that the first axis of rotation -6- is arranged nearer to the stationary bearing element -13- than the second axis of rotation -7-. What is achieved by such a mounting of the heating conductor is that specific tensile stress is achieved by the dead weight of the heating conductor -1- in the individual bands -2- in the direction away from the current feeds -11- and -12-, with the result that sagging or upsetting of the bands -2- is avoided even at operating temperature.

The invention claimed is:

1. An electrical heating conductor configuration for heating a furnace, the electrical heating conductor configuration comprising:
   a current feed;
   at least one pivotable bearing element;
   at least one stationary bearing element disposed between said current feed and said pivotable bearing element;
   a heating conductor configured for heating the furnace and connected to said current feed, said heating conductor having at least one strip-shaped portion with a horizontal sheet-shaped extent and an arcuate curvature with respect to a horizontal plane, said strip-shaped portion formed with individual bands, said individual bands having a width and along said width said arcuate curvature with respect to the horizontal plane, said individual bands being partially and directly mounted by said at least one pivotable bearing element pivotably only in one plane in a longitudinal direction of said individual bands, said heating conductor directly connected to said at least one stationary bearing element;
   a plurality of connection portions; and
   said individual bands have ends connected to one another via said connection portions.

2. The electrical heating conductor configuration according to claim 1, wherein each of said individual bands has two symmetrically arranged kinks along its curvature.

3. The electrical heating conductor configuration according to claim 1, wherein said heating conductor is composed of a material selected from the group consisting of molybdenum, tungsten, molybdenum alloys and tungsten alloys.

4. The electrical heating conductor configuration according to claim 1, wherein said heating conductor and said pivotable bearing element are composed of the same material.

5. An electrical heating conductor configuration for heating a furnace, the electrical heating conductor configuration comprising:

at least one pivotable bearing element;

a heating conductor configured for heating the furnace and having at least one strip-shaped portion with a horizontal sheet-shaped extent and an arcuate curvature with respect to a horizontal plane, said strip-shaped portion formed with individual bands having longitudinal sides and ends, said individual bands having a width and along said width said arcuate curvature with respect to the horizontal plane, said individual bands being partially and directly mounted by said at least one pivotable bearing element pivotably generally in a longitudinal direction of said individual bands;

said pivotable bearing element having a holding portion which is adapted to said arcuate curvature of said individual bands and which at least partially surrounds said individual bands along said longitudinal sides of said individual bands, said holding portion being configured such that said holding portion laterally surrounds one of said individual bands on both lateral sides of said one individual band, said holding portion being adapted to the arcuate curvature of said one individual band for receiving said one individual band and firmly clamping said one individual band, said holding portion being connected pivotably to said bearing element allowing for thermal expansion of said one individual band in the longitudinal direction; and a plurality of connection portions, said ends of said individual bands connected to one another via said connection portions.

6. The electrical heating conductor configuration according to claim 5, further comprising a carrier part; and wherein said pivotable bearing element has first and second axes of rotation, is connected pivotably to said carrier part via said first axis of rotation and is connected pivotably to said holding portion via said second axis of rotation.

7. The electrical heating conductor configuration according to claim 6, further comprising bearing bolts; and wherein said pivotable bearing element has two parallel legs which are spaced apart from one another and which are connected to one another at said first and second axes of rotation at opposite ends of said two parallel legs by means of said bearing bolts, said pivotable bearing element being fastened to said carrier part pivotably and in an insulating manner via a first of said bearing bolts and being connected pivotably to said holding portion via a second of said bearing bolts.

8. The electrical heating conductor configuration according to claim 6, wherein a plurality of said individual bands are disposed parallel to one another and said heating conductor has a form of a meander.

9. The electrical heating conductor configuration according to claim 8, further comprising current feeds connected to said heating conductor and disposed on a same side of the meander.

10. The electrical heating conductor configuration according to claim 9, further comprising at least one stationary bearing element disposed adjacent one of said current feeds.

11. An electrical heating conductor configuration for heating a furnace, the electrical heating conductor configuration comprising:

a plurality of pivotable bearing elements;

a heating conductor configured for heating the furnace and having at least one strip-shaped portion with a horizontal sheet-shaped extent and an arcuate curvature with respect to a horizontal plane, said strip-shaped portion formed with individual bands having longitudinal sides and ends, said individual bands having a width and along said width said arcuate curvature with respect to the horizontal plane, said individual bands being partially and directly mounted by said pivotable bearing elements pivotably generally in a longitudinal direction of said individual bands;

a carrier part;

said pivotable bearing elements each having a holding portion and first and second axes of rotation, said pivotable bearing elements being connected pivotably to said carrier part via said first axis of rotation and being connected pivotably to said holding portion via said second axis of rotation;

a plurality of connection portions;

a plurality of said individual bands are disposed parallel to one another and said individual bands have said ends connected to one another alternately via said connection portions, so that said heating conductor has a form of a meander;

current feeds connected to said heating conductor and disposed on a same side of the meander;

said plurality of pivotable bearing elements disposed such that a respective connecting line of said first and second axes of rotation has an angle of inclination a to the horizontal plane H, in such a way that, in a case of a suspended arrangement of said heating conductor, the second axis of rotation is oriented nearer to a nearest one of said current feeds than the first axis of rotation, and, in a case of a lying arrangement of said heating conductor, the second axis of rotation is oriented further away from said nearest current feed than the first axis of rotation.

12. An electrical heating conductor configuration for heating a furnace, the electrical heating conductor configuration comprising:

at least one pivotable bearing element;

a heating conductor configured for heating the furnace and having at least one strip-shaped portion with a horizontal sheet-shaped extent and an arcuate curvature with respect to a horizontal plane, said strip-shaped portion formed with individual bands, said individual bands having a width and along said width said arcuate curvature with respect to the horizontal plane, said individual bands being partially and directly mounted by said at least one pivotable bearing element pivotably only in one plane in a longitudinal direction of said individual bands, said heating conductor being disposed above a carrier part and held above said carrier part by said at least one pivotable bearing element;

a plurality of connection portions;

said individual bands have ends connected to one another via said connection portions; and at least one stationary bearing element connected to said heating conductor.

13. The electrical heating conductor configuration according to claim 12, wherein the electrical heating conductor configuration is configured as a lying heater.

* * * * *